(12) United States Patent
Ingels et al.

(10) Patent No.: US 6,889,895 B2
(45) Date of Patent: May 10, 2005

(54) METHOD AND DEVICE FOR ACQUIRING AN ELECTRONIC DOCUMENT

(75) Inventors: Didier Ingels, Grand-Rosière (BE); Guy Restiau, Rixensart (BE)

(73) Assignee: Proton World International, Zaventem (BE)

( * ) Notice: Subject to any disclaimer, the term of this patent is extended or adjusted under 35 U.S.C. 154(b) by 0 days.

(21) Appl. No.: 10/451,328

(22) PCT Filed: Dec. 17, 2001

(86) PCT No.: PCT/BE01/00214
§ 371 (c)(1),
(2), (4) Date: Oct. 2, 2003

(87) PCT Pub. No.: WO02/50785
PCT Pub. Date: Jun. 27, 2002

(65) Prior Publication Data
US 2004/0065727 A1 Apr. 8, 2004

(30) Foreign Application Priority Data
Dec. 20, 2000 (EP) .......................................... 00870310

(51) Int. Cl.$^7$ ........................... G06F 17/00; G06F 7/08; G06F 17/60
(52) U.S. Cl. ..................... 235/375; 235/381; 705/16; 705/39; 705/41; 705/65
(58) Field of Search ................ 235/375, 380, 235/381, 383; 705/16, 17, 35, 39, 41, 42, 44, 64, 65

(56) References Cited

U.S. PATENT DOCUMENTS 5,754,654 A  *  5/1998  Hiroya et al. .................. 705/76
5,991,747 A  * 11/1999  Tomoyuki et al. ............. 705/41
6,119,945 A  *  9/2000  Muller et al. ................ 235/492
2003/0154169 A1 * 8/2003  Yanai ........................... 705/65

FOREIGN PATENT DOCUMENTS

| EP | 0 628 928 A1 | 12/1994 |
| EP | 0 713 198 A2 | 5/1996 |
| FR | 2 642 202 | 7/1990 |

* cited by examiner

Primary Examiner—Karl D. Frech
Assistant Examiner—April Taylor
(74) Attorney, Agent, or Firm—Lisa K. Jorgenson; E. Russell Tarleton; Seed IP Law Group PLLC

(57) ABSTRACT

A prior introduction into the memory of a document in a non-validated state, to be acquired by validation, and a function of acquiring the document, independent of the electronic purse function. When it is wished to acquire such a document, the sales terminal and the independent functions of acquisition and electronic payment of the card are put in communication. A document acquisition order is placed, transmitted to the acquisition function by the terminal. Verification of the presence in the card of the document to be validated and its authenticity and a verification of the presence and authenticity of an amount in the purse for the acquisition of a document are organized. If the two verification steps are positive, a simultaneously sending of a global agreement signal to each of the functions is organized in order simultaneously on the one hand to validate the document as an acquired document and on the other hand to debit the purse by the amount of the acquisition.

17 Claims, 1 Drawing Sheet

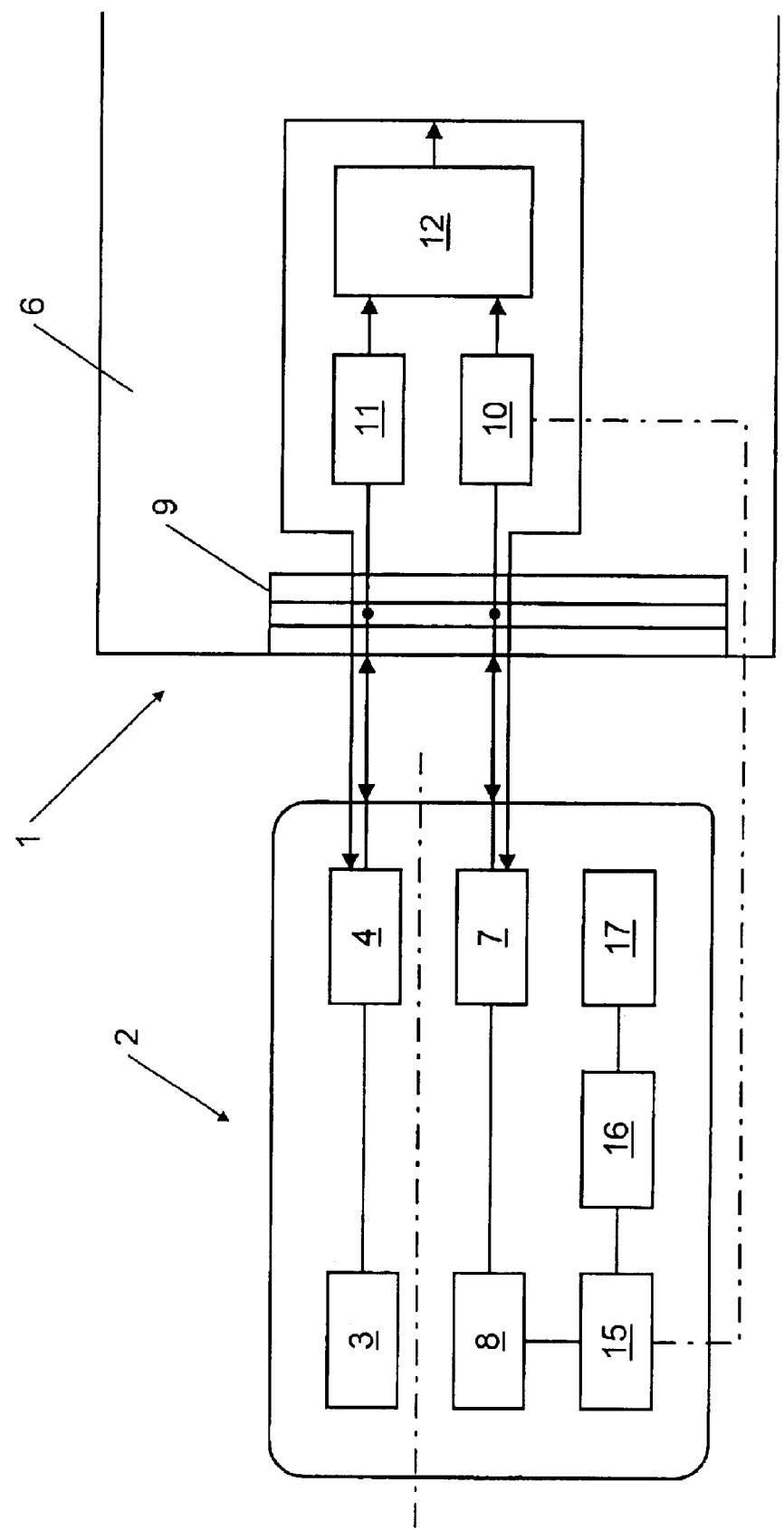

METHOD AND DEVICE FOR ACQUIRING AN ELECTRONIC DOCUMENT

FIELD OF THE INVENTION

The present invention concerns a method of acquiring an electronic document by means on the one hand of a smart card with memory and with an electronic payment means function and on the other hand a sales terminal for the document. The electronic payment means function may be of the electronic purse type or in particular a debit/credit card.

BACKGROUND OF THE INVENTION

Smart cards are finding more and more uses in everyday life. As a result any one individual may be in the possession of several cards of this type. In order to avoid the inconvenience resulting from such a multiplicity of cards to be carried, managed and handled, the expedient has been adopted of arranging some of these cards so that they can be used for several functions. A typical case is that of the smart card comprising an electronic purse function and at least one function of acquiring one or more electronic documents such as public transport or parking tickets or for access to a show.

When the same smart card is used for these two functions of payment means and acquisition, these must be installed therein so that they are completely independent of each other and therefore without any possibility of mutual influence and interference. However, the prime need is an absolute certainty that a document acquired corresponds to the money debited for example from the electronic purse, and vice-versa. If a fault in functioning occurs during the acquisition operation, the situation cannot arise in which money has been taken from the electronic purse whereas the document has not been produced and/or stored legitimately and validly in the card or, conversely, in which the document has been produced/validated but the money has not been deducted.

BRIEF SUMMARY OF THE INVENTION

The aim of the present invention is to procure a method which affords certainty that, if the money has been taken, the document is acquired and vice-versa.

To this end, according to the invention, the method comprises a prior introduction into the memory of a document in a non-validated state, to be acquired by validation, and a function of acquiring the document, independent of the electronic purse function. When it is wished to acquire such a document, the sales terminal and the independent functions of acquisition and electronic payment means of the card are put in communication. A document acquisition order is placed, transmitted to the acquisition function by means of the terminal. Verification of the presence in the card of the document to be validated and its authenticity and a verification of the presence and authenticity of an amount in the purse for the acquisition of a document are organised. If the two verification steps are positive, a simultaneously sending of a global agreement signal to each of the functions is organised in order simultaneously on the one hand to validate the document as an acquired document and on the other hand to debit the purse by the amount of the acquisition.

In the present invention, "acquire" should be understood also in the sense of obtaining a document giving certain rights which are usually purchased either directly or indirectly, as in the case of a subscription to services paid in advance.

According to one embodiment, the method of the invention comprises, by putting in communication with the terminal, an updating either of the document or of a copy thereof after the positive step of verifying the presence and authenticity of the document, and next a temporary storage of the updated document or copy. For the validation of the updated document or copy, on reception of the global agreement signal, a writing is carried out, in a location reserved in the acquisition function, of this document or of its updated copy, simultaneously with a writing of the debited amount in a reserved location of the electronic purse function.

Another object of the invention is a device for acquiring an electronic document, comprising a smart card with memory and with an electronic purse function, and a sales terminal for the document.

In the device according to the invention, the smart card also comprises an acquisition function independent of the purse function, and a memory for storing therein a document in the non-validated state. The terminal comprises means of communication with the card, adapted to transmit to the card an order to acquire the document. The device also comprises a means of verifying the presence in the card of the document to be validated and its authenticity, this means being arranged to produce a first agreement signal, and a means of verifying the presence and authenticity of a sufficient amount in the purse for acquiring the document, this means being arranged to produce a second agreement signal. In addition, a means of combining the first and second agreement signals is provided, arranged and connected so as to deliver simultaneously, to the purse function, a global agreement signal for debiting an amount for acquiring the document and, to the acquisition function, the same global agreement signal for validating the acquired document.

Other details and particularities of the invention will emerge from the claims and the description of the drawing which is annexed to the present document and which illustrates, by way of non-limiting example, the method and particular embodiments of the device according to the invention.

BRIEF DESCRIPTION OF THE DRAWING

The single FIGURE shows schematically a device of the invention equipped for fulfilling the two independent functions cited by way of example.

DETAILED DESCRIPTION OF THE INVENTION

The device 1 of the invention, intended for acquiring an electronic document, comprises various known elements such as a smart card 2 with memory 3 and with an electronic purse function 4 and a sales terminal 6 for the document.

According to the invention, the smart card 2 is also equipped with at least one acquisition function 7, independent of the purse function 4, and another memory 8 arranged in order to store therein, in the non-validated state, a document to be acquired. The terminal 6 for its part comprises known means 9 of communication with the card 2, adapted so that an individual can transmit to it between an acquisition order and a payment order for the document.

The device 1 of the invention also comprises various means, including the following, known per se to persons skilled in the art and functionally connected together. A means 10 is arranged for verifying the presence, in the card 2, of the document to be validated and the authenticity thereof and for producing a first agreement signal if the card 2 is in order in this regard. A means 11 is intended for verifying the presence and authenticity of a sufficient amount, in the purse 4, for acquiring the document and is arranged so as to produce a second agreement signal if the card 2 is in order in this regard. A means 12 provides for the combination of the first and second agreement signals and is arranged and connected so as to simultaneously deliver, after reception of these two signals, to the purse function 4, a global signal agreeing the debiting of a document acquisition amount and, to the acquisition function 6, the same global agreement signal for validating the document acquired.

The device 1 can also comprise, connected to the means 10 of verifying the document, a means 15 of updating either the document stored in the memory 8 or a copy thereof, on reception of the first agreement signal, a memory 16 for temporary storage of the document, or of its copy, updated, and a location or memory 17 reserved for storing the document, or the copy, updated, only after its validation by the reception of the global agreement signal.

The method according to the invention, which can be implemented by means of the above device 1, essentially comprises the following steps.

When the card 2 is prepared, a document, such as a transport ticket, to be acquired by validation, and an acquisition function 7 for the document, independent of the purse function 4, are as a preliminary introduced into the memory 8 thereof, in a non-validated state.

In order to acquire this ticket, the holder of the card 2 puts the appropriate sales terminal 6 and the independent functions of acquisition 7 and purse 4 of the card 2 in communication in a known manner.

The holder gives to the acquisition function 7, by means of the terminal 6, an order to acquire the document.

The device 1 effects, by the means 10 and respectively 11, a verification of the presence in the card 2 of the document to be validated and its authenticity as well as verification of the presence and authenticity of an amount, in the purse 4, sufficient for acquiring the document.

If the two verifications are positive, the two agreement signals which result therefrom give rise to a simultaneous sending, by the combination means 12, of a global agreement signal to each of the functions 4 and 7 in order simultaneously on the one hand to validate the document as an acquired document and on the other hand to debit the purse 4 with the amount of the acquisition.

In one embodiment of the invention, when the card 2 and terminal 6 are put in communication, a positive verification of the presence and authenticity of the document causes an updating either of the document or of a copy thereof as well as a temporary storage, for example in the memory 16, of the document or copy updated.

For the validation proper of the document or copy updated, the device 1 effects, on reception of the global agreement signal, a writing, in a location 17 reserved for the acquisition function 7, of this document or its updated copy, simultaneously with a writing of the amount debited in a reserved location of the purse function 4.

It must be understood that the invention is in no way limited to the embodiments described and that many modifications can be made to them without departing from the scope of the claims.

Thus the method according to the invention can comprise in addition a recording in the terminal 6 of evidence of the debiting of the acquisition amount.

The various memories necessary in the card 2 can be just a single memory 3 divided into partial memories independent of one another, or connected, according to requirements.

The distribution of the elements and means cited above, between the card 2 and the terminal 6, may be different from that proposed, without departing from the scope of the claims.

Several acquisition functions independent of one another can be located in the same card 2 and be used by means of a terminal 6 able to activate these functions or distinct terminals 6 for each function.

With the figures, the following reference numbers are used for the respective elements as follows:

device of the invention, 1; smart card, 2; memory of 2, 3; electronic purse (function), 4; sales terminal, 6; acquisition function, 7; additional memory, 8; communication means, 9; document presence verification means, 10; amount presence verification means, 11; means of combining two signals, 12; updating means, 15; temporary storage memory, 16; validated document memory, 17.

All of the above U.S. patents, U.S. patent application publications, U.S. patent application, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of acquiring an electronic document by means on the one hand of a smart card with a memory and with an electronic payment means function and on the other hand a sales terminal for the document, the method being characterised in that it comprises:

(a) a prior introduction into the memory of a document in a non-validated state, to be acquired by validation, as well as a function of acquiring the document, independent of a purse function;

(b) a putting in communication of the sales terminal and independent acquisition and purse functions of the card;

(c) an order to acquire the document, transmitted by means of the terminal to the acquisition function;

(d) verification of the presence in the card of the document to be validated and of its authenticity;

(e) verification of the presence and authenticity of an amount in the purse for acquiring the document; and (f) if steps (d) and (e) are positive, simultaneous sending of a global agreement signal to each of the functions in order simultaneously on the one hand to validate the document as an acquired document and on the other hand to debit the purse by the amount of the acquisition.

2. The method according to claim 1, comprising:

by the putting in communication with the terminal, an updating either of the document or of a copy thereof after the positive step (d) of verifying the presence and authenticity of the document;

temporary storage of the document or copy updated; and for the validation of the updated document, on reception of the global agreement signal, of the document or the copy thereof updated in a reserved location of the acquisition function, simultaneously with a writing of the amount debited in a reserved location of the purse function.

3. The method of claim 1, comprising a recording in the terminal of evidence of the debiting of the acquisition amount.

4. A device for acquiring an electronic document, comprising:

a smart card with memory and with an electronic payment means function; and a sales terminal for the document;

the smart card also comprising an acquisition function independent of the purse function, and a memory for storing therein a document in the non-validated state;

the terminal comprising means of communicating with the card, and transmitting to the card an order to acquire the document;

the device further comprising:

means of verifying the presence in the card of the document to be validated and its authenticity, arranged to produce a first agreement signal;

means of verifying the presence and authenticity of a sufficient amount in the purse for acquiring the document, arranged to produce a second agreement signal; and means of combining the first and second agreement signals, arranged and connected so as to deliver simultaneously to the purse function, a global agreement signal for the debiting of an amount for acquiring the document; and to the acquisition function, a global agreement signal for validation of the acquired document.

5. The device according to claim 4, comprising:

connected to the document verification means, means of updating either the document or a copy thereof on reception of the first agreement signal;

a memory for temporary storage of the updated document; and a location reserved for the updated document, after validation thereof by the reception of the global agreement signal.

6. A method of acquiring an electronic document comprising:

placing a smart card in communication with a sales terminal;

communicating an order to acquire a document;

introducing the document into a memory of the smart card in a non-validated state using an acquisition function, independent of a purse function on the smart card;

verifying the presence in the card of the document to be validated and of its authenticity;

verifying of the presence and authenticity of an amount in the purse for acquiring the document; and sending a global agreement signal to each of the acquisition and purse functions in order to validate the document as an acquired document and to debit the purse by the amount of the acquisition if an accepted verification occurs.

7. The method of claim 6 further including:

simultaneously sending the global agreement signal to each of the functions in order simultaneously on the one hand to validate the document as an acquired document and on the other hand to debit the purse by the amount of the acquisition.

8. A device for acquiring an electronic document comprising:

a smart card having a first memory and an electronic payment purse circuit and an acquisition function independent of the purse function, and a second memory for storing therein a document in the non-validated state;

the smart card further comprising means for verifying the presence in the card of the document to be validated and its authenticity and arranged to produce a first agreement signal; and a means of verifying the presence and authenticity of a sufficient amount in the purse for acquiring the document and arranged to produce a second agreement signal; and means of combining the first and second agreement signals, arranged and connected so as to deliver to the purse function, a global agreement signal for the debiting of an amount for acquiring the document and to the acquisition function, a global agreement signal for validation of the acquired document.

9. A method acquiring an electronic document, comprising:

introducing the document in a non-validated state into a memory of a smart card;

verifying the presence of the document to be validated in the smart card; and simultaneously sending a global agreement signal to simultaneously validate acquisition of the document in the smart card and to debit a purse in the smart card.

10. The method of claim 9, comprising, prior to debiting the purse of the smart card, verifying the presence and authenticity of an amount in the purse for acquiring the document.

11. The method of claim 10, comprising, prior to verification of the presence of the document, the step of placing the smart card in communication with a sales terminal.

12. A device for acquiring an electronic document, comprising:

a smart card having a memory configured to receive in a non-validated state and an electronic payment purse circuit, the smart card further including means for verifying the presence in the card of the document to be validated and its authenticity and to produce a first agreement signal, and means of verifying the presence and authenticity of a sufficient amount in the purse for acquiring the document and to produce a second agreement signal, and means for combining the first and second agreement signals so as to simultaneously deliver to the purse function, a global agreement signal for the debiting of the amount for acquiring the document and a global agreement signal for validation of the acquired document.

13. A device for acquiring an electronic document, comprising:

a smart card configured to communicate with a sales terminal, the smart card comprising:
a first memory for receiving in a non-validated state a ticket;
a second memory configured to store a purse;
a verification circuit configured to verify the presence of the non-validated ticket in the first memory and to generate a first agreement signal; and
a circuit for sending the first agreement signal and to simultaneously validate acquisition of the ticket and debit the purse an amount sufficient for acquiring the document.

14. An electronic document acquisition system, comprising:

a sales terminal; and
a smart card configured to communicate with the sales terminal, the smart card configured to receive in a first memory the electronic document in a non-validated state and to store in a second memory a purse, the smart card including a verification circuit configured to verify the presence of the non-validated electronic document in the first memory and to generate a first agreement signal, and a circuit for sending the first agreement signal and to simultaneously validate acquisition of the electronic document and debit the purse an amount sufficient for acquiring the electronic document.

15. The system of claim 14, wherein the card is configured to verify the presence and authenticity of the amount in the purse for acquiring the electronic document.

16. The system of claim 14, wherein the sales terminal comprises a circuit for communicating with the smart card and transmitting to the smart card an order to acquire the electronic document.

17. The system of claim 16, wherein the circuit for sending the first agreement and to simultaneously validate acquisition and debit the purse is configured to receive the order from the sales terminal and then simultaneously validate acquisition of the electronic document and debit the purse the amount sufficient for acquiring the electronic document.

* * * * *

UNITED STATES PATENT AND TRADEMARK OFFICE
CERTIFICATE OF CORRECTION

PATENT NO.     : 6,889,895 B2
DATED          : May 10, 2005
INVENTOR(S)    : Didier Ingels et al.

It is certified that error appears in the above-identified patent and that said Letters Patent is hereby corrected as shown below:

Column 5,
Line 21, "of the document" should read as -- writing of the document --.

Signed and Sealed this

Twenty-fifth Day of October, 2005

JON W. DUDAS
*Director of the United States Patent and Trademark Office*